(12) United States Patent
Lee et al.

(10) Patent No.: US 11,966,835 B2
(45) Date of Patent: Apr. 23, 2024

(54) DEEP NEURAL NETWORK ACCELERATOR WITH FINE-GRAINED PARALLELISM DISCOVERY

(71) Applicant: NVIDIA Corp., Santa Clara, CA (US)

(72) Inventors: Ching-En Lee, Ann Arbor, MI (US); Yakun Shao, Santa Clara, CA (US); Angshuman Parashar, Northborough, MA (US); Joel Emer, Acton, MA (US); Stephen W. Keckler, Austin, TX (US)

(73) Assignee: NVIDIA CORP., Santa Clara, CA (US)

( * ) Notice: Subject to any disclaimer, the term of this patent is extended or adjusted under 35 U.S.C. 154(b) by 926 days.

(21) Appl. No.: 15/929,093

(22) Filed: Jan. 23, 2019

(65) Prior Publication Data
US 2019/0370645 A1    Dec. 5, 2019

Related U.S. Application Data

(60) Provisional application No. 62/680,978, filed on Jun. 5, 2018.

(51) Int. Cl.
*G06N 3/08*       (2023.01)
*G06N 3/04*       (2023.01)

(52) U.S. Cl.
CPC .................. *G06N 3/08* (2013.01); *G06N 3/04* (2013.01)

(58) Field of Classification Search
CPC ........... G06N 3/063; G06N 3/08; G06F 7/523
See application file for complete search history.

(56) References Cited

U.S. PATENT DOCUMENTS

| | | |
|---|---|---|
| 5,008,833 A | 4/1991 | Agranat et al. |
| 5,091,864 A | 2/1992 | Baji et al. |
| 5,297,232 A | 3/1994 | Murphy |
| 5,319,587 A | 6/1994 | White |
| 5,704,016 A | 12/1997 | Shigematsu et al. |
| 5,768,476 A | 6/1998 | Sugaya et al. |
| 6,560,582 B1 | 5/2003 | Woodall |
| 7,082,419 B1 | 7/2006 | Lightowler |
| 10,817,260 B1 | 10/2020 | Huang et al. |
| 10,929,746 B2 | 2/2021 | Litvak et al. |
| 2003/0061184 A1 | 3/2003 | Masgonty et al. |
| 2009/0210218 A1 | 8/2009 | Collobert et al. |

(Continued)

FOREIGN PATENT DOCUMENTS

CN    107463932 A  *  7/2017  ........... G06K 9/4671

OTHER PUBLICATIONS

Han, EIE: Efficient Inference Engine on Compressed Deep Neural Network, IEEE, pp. 243-254 (Year: 2016).*

(Continued)

*Primary Examiner* — Viker A Lamardo
*Assistant Examiner* — Sidney Vincent Bostwick
(74) *Attorney, Agent, or Firm* — Rowan TELS LLC

(57) ABSTRACT

A sparse convolutional neural network accelerator system that dynamically and efficiently identifies fine-grained parallelism in sparse convolution operations. The system determines matching pairs of non-zero input activations and weights from the compacted input activation and weight arrays utilizing a scalable, dynamic parallelism discovery unit (PDU) that performs a parallel search on the input activation array and the weight array to identify reducible input activation and weight pairs.

20 Claims, 15 Drawing Sheets

(56) References Cited

U.S. PATENT DOCUMENTS

| | | |
|---|---|---|
| 2018/0004689 A1 | 1/2018 | Marfatia et al. |
| 2018/0046897 A1* | 2/2018 | Kang ................ G06N 3/0445 |
| 2018/0121796 A1 | 5/2018 | Deisher et al. |
| 2018/0173676 A1 | 6/2018 | Tsai et al. |
| 2019/0050717 A1 | 2/2019 | Temam et al. |
| 2019/0138891 A1 | 5/2019 | Kim et al. |
| 2019/0179975 A1 | 6/2019 | Rassekh et al. |
| 2019/0180170 A1 | 6/2019 | Huang et al. |
| 2019/0340510 A1* | 11/2019 | Li ...................... G06N 3/0454 |
| 2019/0370645 A1 | 12/2019 | Lee et al. |
| 2019/0392287 A1 | 12/2019 | Ovsiannikov et al. |
| 2021/0004668 A1* | 1/2021 | Moshovos .......... G06N 3/0454 |
| 2021/0125046 A1 | 4/2021 | Moshovos et al. |

OTHER PUBLICATIONS

Andri, YodaNN: An Ultra-Low Power Convolutional Neural Network Accelerator Based on Binary Weights, IEEE, pp. 238-241 (Year: 2016).*

Yavits, Leonid, Amir Morad, and Ran Ginosar. "Sparse matrix multiplication on an associative processor." IEEE Transactions on Parallel and Distributed Systems 26.11 (2014): 3175-3183. (Year: 2014).*

Streat, Lennard, Dhireesha Kudithipudi, and Kevin Gomez. "Non-volatile hierarchical temporal memory: Hardware for spatial pooling." arXiv preprint arXiv:1611.02792 (2016). (Year: 2016).*

U.S. Appl. No. 16/517,431, filed Jul. 19, 2019, Yakun Shao.

F. Sijstermans. The NVIDIA deep learning accelerator. In Hot Chips, 2018.

K. Kwon et al. Co-design of deep neural nets and neural net accelerators for embedded vision applications. In Proc. DAC, 2018.

N. P. Jouppi et al. In-datacenter performance analysis of a tensor processing unit. In Proc. ISCA, 2017.

T. Chen et al. DianNao: A small-footprint high-throughput accelerator for ubiquitous machine-learning. In Proc. ASPLOS, 2014.

W. Lu et al. FlexFlow: A flexible dataflow accelerator architecture for convolutional neural networks. In Proc. HPCA, 2017.

Y. Chen, J. Emer, and V. Sze. Eyeriss: A spatial architecture for energy-efficient dataflow for convolutional neural networks. In Proc. ISCA, 2016.

Angshuman Parashar et al. "SCNN: An Accelerator for Compressed-sparse Convolutional Neural Networks" (Year: 2017).

Duckhwan Kim* et al. "Neurocube: A Programmable Digital Neuromorphic Architecture with High-Density 3D Memory" (Year: 2016).

Kartik Hegde et al. "UCNN: Exploiting Computational Reuse in Deep Neural Networks via Weight Repetition" ,Apr. 18, 2018. (Year: 2018).

* cited by examiner

DEEP NEURAL NETWORK ACCELERATOR WITH FINE-GRAINED PARALLELISM DISCOVERY

CROSS REFERENCE TO RELATED APPLICATIONS

This application claims priority and benefit under 35 U.S.C. 119(e) to U.S. Application Ser. No. 62/680,978, titled "Exploiting Unstructured Sparsity in CNN Accelerators via Fine-Grained Parallelism Discovery", and filed on Jun. 5, 2018, the contents of which are incorporated by reference herein in their entirety.

BACKGROUND

Accelerating neural network inference has become an increasingly important design target for both data center and mobile hardware. Although most of the commercially available inference accelerators are focused on dense convolution, e.g., the NVIDIA Deep Learning Accelerator (NVDLA), leveraging sparsity to improve performance and energy efficiency has gained interest.

Sparse convolutional neural network (SCNN) accelerators exploit the intrinsic redundancy in data representation of a network to achieve high performance and energy-efficiency. Recent characterization of a wide range of contemporary neural networks has shown that more than 50% of input activations and weights can be maintained at zero utilizing network pruning and compression. However, convolution with unstructured, sparse weights and input tensors does not exhibit the same regular data-access patterns as dense convolution, leading to increased complexities in dataflow orchestration and resource management. Specifically, two types of irregularities are introduced in SCNN accelerators: 1) the weight and input activation data layout are not contiguous, as zero-valued data is eliminated; and 2) the address to the accumulation buffer is statically unknown and can only be resolved dynamically when the indices of weight and input activation are fetched.

Many conventional SCNN accelerators merely leverage unstructured sparsity in either weights or input activations but not both. By only handling irregularity from one of the operands to multiply and accumulate (MAC) units, these approaches simplify the issues associated with unstructured sparsity significantly but fail to fully exploit the potential benefits of skipping redundant computation and memory movement caused by sparsity in both MAC operands. Additionally, because the compressed input activations and weights arrays are both unstructured, sequential decoding is unable to identify enough parallel operations to consistently maintain the available computing resources at high capacity.

One traditional implementation of SCNNs calculates the Cartesian product of compressed weights and input activations directly. The multiplied results are accumulated in parallel in an accumulation buffer. This implementation of a SCNN simplifies the control logic that handles the irregularity in weights and inputs because it contiguously reads weights and input activations. However, this comes at the cost of high power consumption in the accumulation buffer design due to the complexity of handling simultaneously arbitrary accesses to the accumulation buffer.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are systems and methods that utilize a novel dataflow to leverage both spatial and temporal reduction to reduce the power consumption and computational load of the accumulator buffer in SCNN accelerators. The system utilizes both weight and input activation sparsity to achieve greater computational efficiency. To maximize the opportunities for spatial and temporal reduction, the system utilizes a scalable parallelism discovery unit (PDU) that efficiently determines weight and input activation pairs that may be multiplied and reduced in a later computational stage. The system may achieve increased energy efficiency with the same density of input activations and weights compared to conventional solutions.

Figure 1:
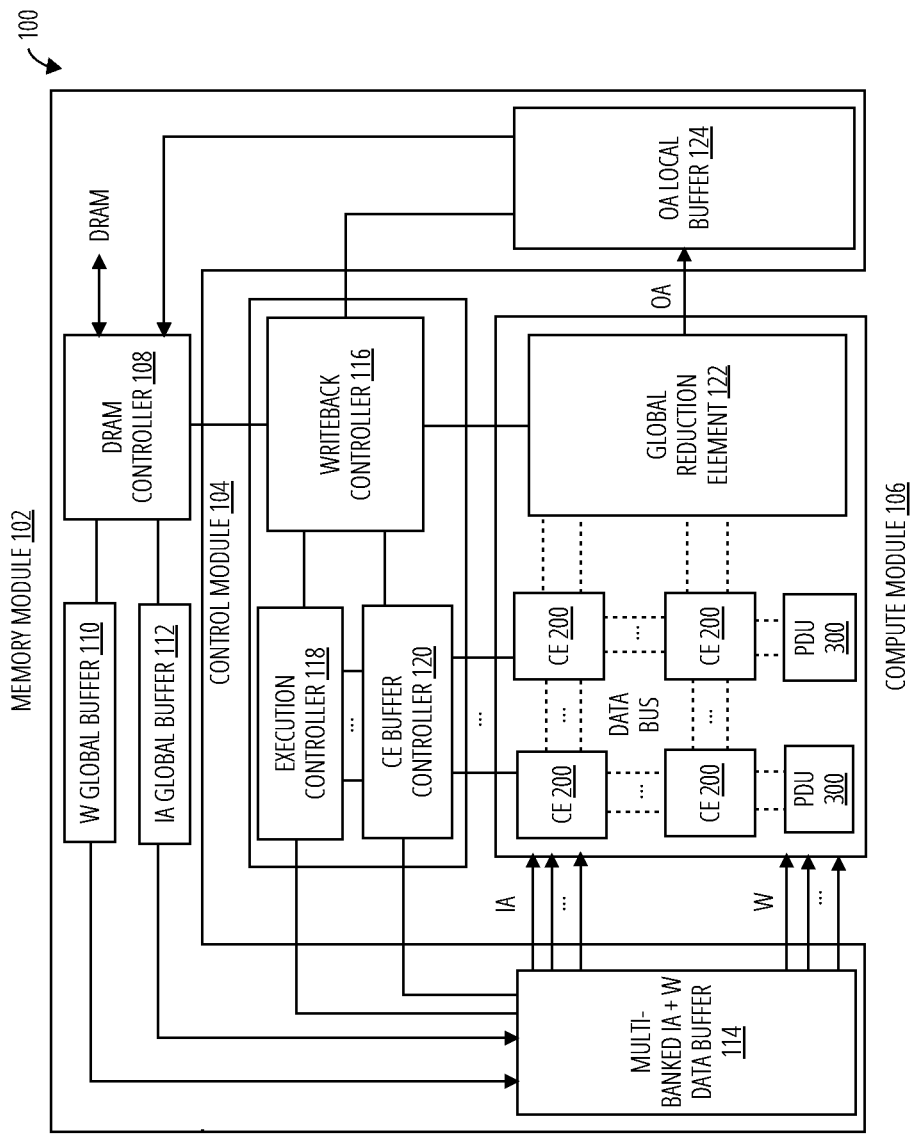
FIG. 1 illustrates an embodiment of an accelerator system 100.

Referring to FIG. 1, an accelerator system 100 in one embodiment comprises a memory module 102, a control module 104, and a compute module 106. The memory module 102 further comprises a DRAM controller 108, a weight global buffer 110, an input activation global buffer 112, a multi-banked input activation and weight data buffer 114, and an output activation local buffer 124. The control module 104 further comprises a writeback controller 116, an execution controller 118, and a computing element buffer controller 120. The compute module 106 comprises a global reduction element 122, an output activation local buffer 124, one or more computing element 200, and one or more parallelism discovery unit 300.

The DRAM controller 108 interfaces with the dynamic random-access memory (DRAM), the weight global buffer 110, and the input activation global buffer 112 to send input activations (IAs) and weights (Ws), and their coordinate indexes (CIs), to the multi-banked input activation and weight data buffer 114. The DRAM controller 108 further exchanges controls from the writeback controller 116. The multi-banked input activation and weight data buffer 114 receives controls from the execution controller 118 and the computing element buffer controller 120 and responds to the controls by communicating compressed IAs and Ws, and their CIs, to the compute module 106. The output activation local buffer 124 receives output activations (OAs) from the global reduction element 122 and sends the OAs to the DRAM controller 108.

The writeback controller 116 exchanges controls with the DRAM controller 108, the execution controller 118, the computing element buffer controller 120, and the global reduction element 122. The computing element buffer controller 120 controls each computing element 200. Thus, the control module 104 comprising these elements controls each computing element 200, the one or more parallelism discovery unit 300, and the global reduction element 122.

Each computing element 200 and the one or more parallelism discovery unit 300 compute the sparse convolution to generate output activations (OAs) that are input to the global reduction element 122 for further partial sum reduction (in some embodiments), post processing like bias addition and linear rectification (ReLU), and compression for the next layer of the SCNN. Both of the input activations and the weights for the sparse convolution are stored in compressed forms in which each is associated with its horizontal (X), vertical (Y), input channel (C), and output channel (K) indices. The OAs are compressed in the global reduction element 122 after the partial sums are accumulated. The resulting data and coordinate index are sent to the output activation local buffer 124. The following examples assume a SCNN having an input layer with a width W, a height H, and a depth C; a plurality of K hidden layers each having a width S, a height R, and a depth C; and an output layer having a width Q, a height P, and a depth K.

The compute module 106 typically comprises an array of parallelism discovery units and an array of computing elements. The parallelism discovery units utilize the CIs to determine row selections and column selections for the weight and input activation vectors. These are applied to the array of computing elements. The array of computing elements also receives the weights and input activations which applies the column and row selections to the weight and input activation vectors to compute the output activations.

Figure 2:
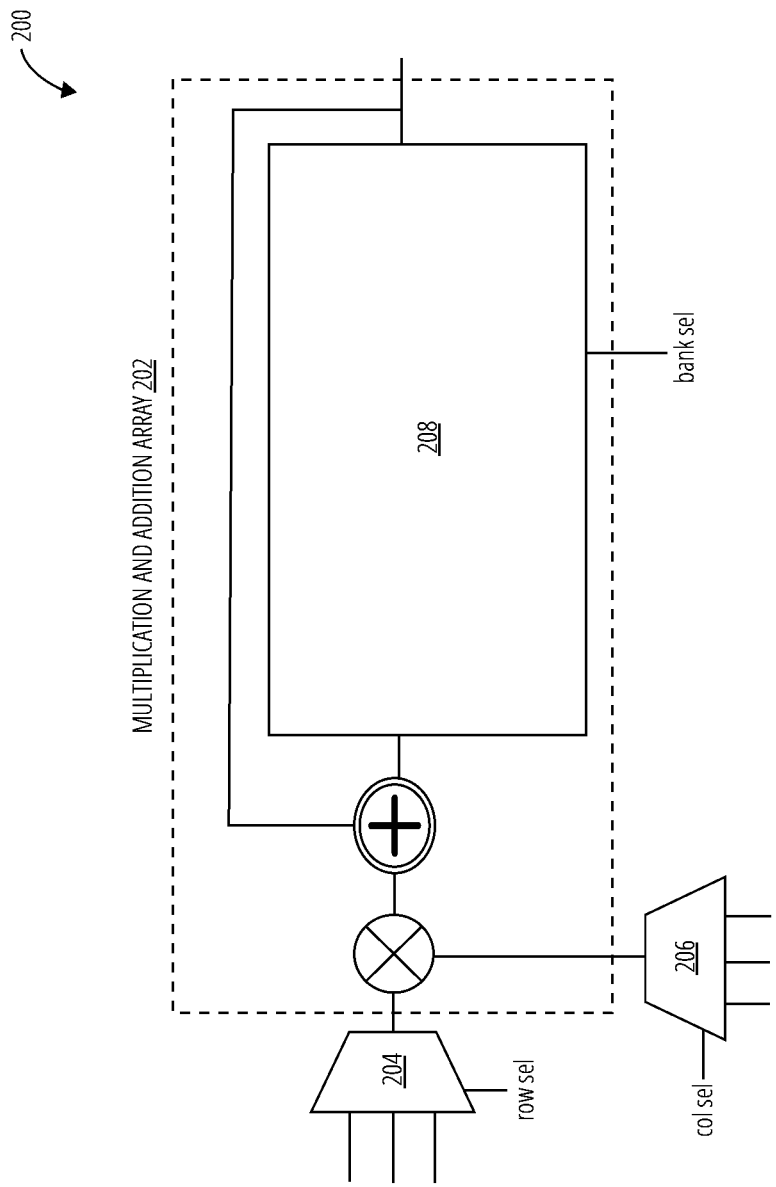
FIG. 2 illustrates an embodiment of a computing element 200.

Referring now to FIG. 2, in one embodiment a computing element 200 comprises an array of multiplication and addition units 202, a row selection mux 204, and at least one column selection mux 206 for selecting its operands. The output from the multiplication and addition array 202 is a partial sum accumulated in local register banks 208 or other memory for the computing element 200, where the particular bank of the address unit 208 for storing results is selected by the input activation and weight indices. The size of the local register banks affects the energy consumption of the system because every partial sum accumulated in the local register banks involves two buffer accesses: a READ to read the previous partial sum out of the local register banks, and a WRITE to write the updated partial sum back to the local register banks.

A distributed design is utilized in which each computing element 200 accumulates to its own local register banks. In this way, the per-access power cost for accumulation of partial sums is reduced. Reducing the size of the local register banks increases the locality requirements for the data being processed by a particular computing element 200 in order to maintain computational efficiency. The parallelism discovery unit 300 may be utilized to maintain high data locality for the computing elements.

Figure 3:
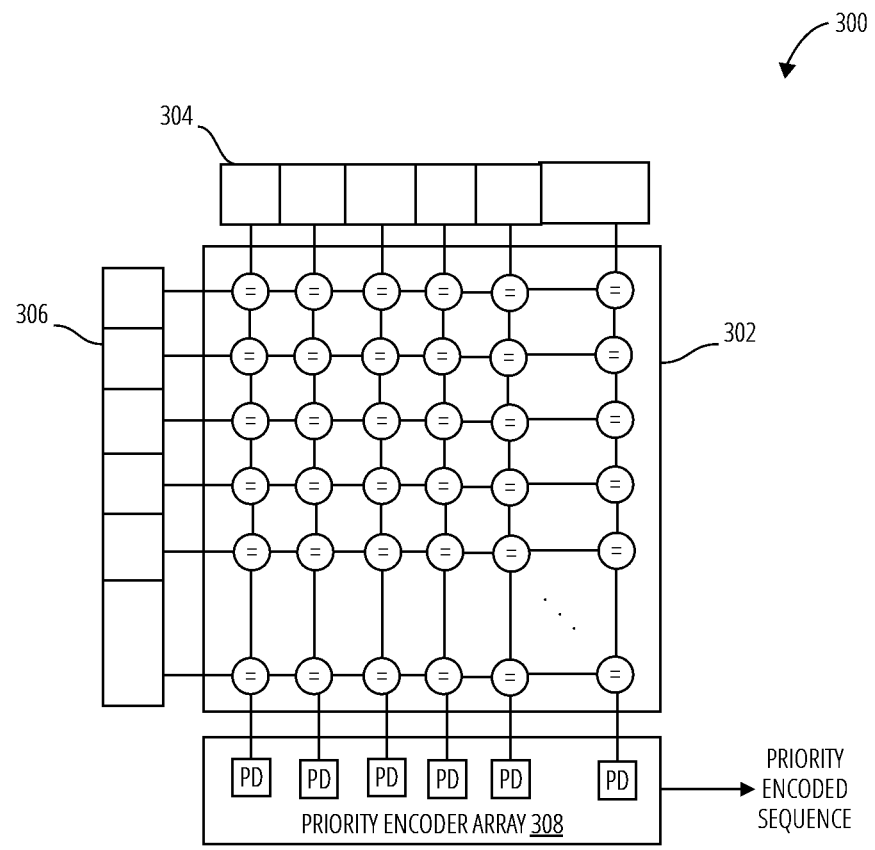
FIG. 3 illustrates an embodiment of a parallelism discovery unit 300.

Referring to FIG. 3, a parallelism discovery unit 300 in one embodiment comprises a comparator array 302, a column coordinate index 304, a row coordinate index 306, and an array of priority encoders 308.

The parallelism discovery unit 300 enables a dataflow that facilitates opportunities for cross-input-channel reduction. The weight vector and activation vector are organized as a tensor along the input channel (C) dimension so that consecutive multiplication results may be reduced to the same accumulation buffer entry. Spatially, different computational elements operate on weights and inputs at different corresponding indices of the weight and activation vectors. After cross-input-channel reduction is done, if the weight kernel size is larger than 1, e.g., 3×3, the parallelism discovery unit 300 may also perform spatial reduction diagonally, further reducing traffic to the output activation local buffer 124.

The column coordinate index 304 and the row coordinate index 306 receive the channel indices of weights and input activations as inputs, respectively. The comparator array 302 compares the column coordinate index 304 to the row coordinate index 306. For example, the left-most column of the comparator array 302 compares the first entry of the column coordinate index 304 to each of the entries of the row coordinate index 306. Each comparator may signal a "1" or "0" based on whether the column and row indices match or do not match, respectively. Each column of the outputs of the comparator array 302 are sent to the array of priority encoders 308, which identifies matching indices from weights and inputs. Each priority encoder of the array of priority encoders 308 generates a vector of C row addresses, and an additional valid bit per address to indicate whether a match is found or not, resulting in a priority encoded sequence of $(\log_2(C)+1)$ bits. This sequence is sent to each computing element's sequence decode unit 400 to obtain the indices of the matching IA and W. The array of priority encoders 308 sends the priority encoded sequence of matching indices to the row selection mux 204 and the column selection mux 206 of the computing elements. Each computing element 200 then selects the weights and input activations from the corresponding indexes and multiplies them together to generate the partial sums.

Figure 4:
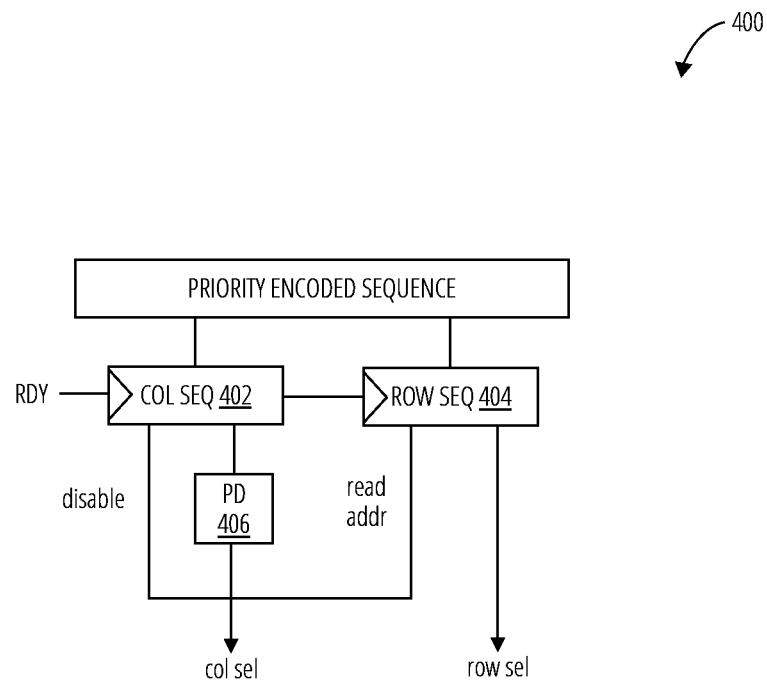
FIG. 4 illustrates an embodiment of a sequence decode unit 400.

Referring to FIG. 4, a sequence decode unit 400 comprises a column sequence storage 402, a row sequence storage 404, and a priority encoder 406.

A sequence is received by the sequence decode unit 400 from a parallelism discovery unit 300 to generate the row_and col_selection signals that are sent to a computing element 200. These signals are utilized by the MAC unit to select the operands for multiplication. In other words, the sequence decode unit 400 decodes the sequence generated from the parallelism discovery unit 300 to obtain the indices that are used to fetch IA and W operands for multiplication.

The sequence is separated into the column (for the W operand index) and the row sequence (for the IA operand index) and buffered at the sequence decoder. The column sequence storage 402 stores the 1-bit MSB indicating whether there is any matching IA found for a corresponding W, while the row sequence storage 404 stores the encoded sequence of all the matched IA addresses for each W. The priority encoder 406 is then utilized to generate the column select which is also utilized to determine the row select. This process is performed iteratively on the column sequence in the column sequence storage 402, generating a sequence of column select, row select pairs over multiple cycles, which are sent to a computing element to accumulate the partial sums by processing (i.e., multiplying the corresponding IA and W and adding to the accumulated sum) each sequence pair.

Figure 5:
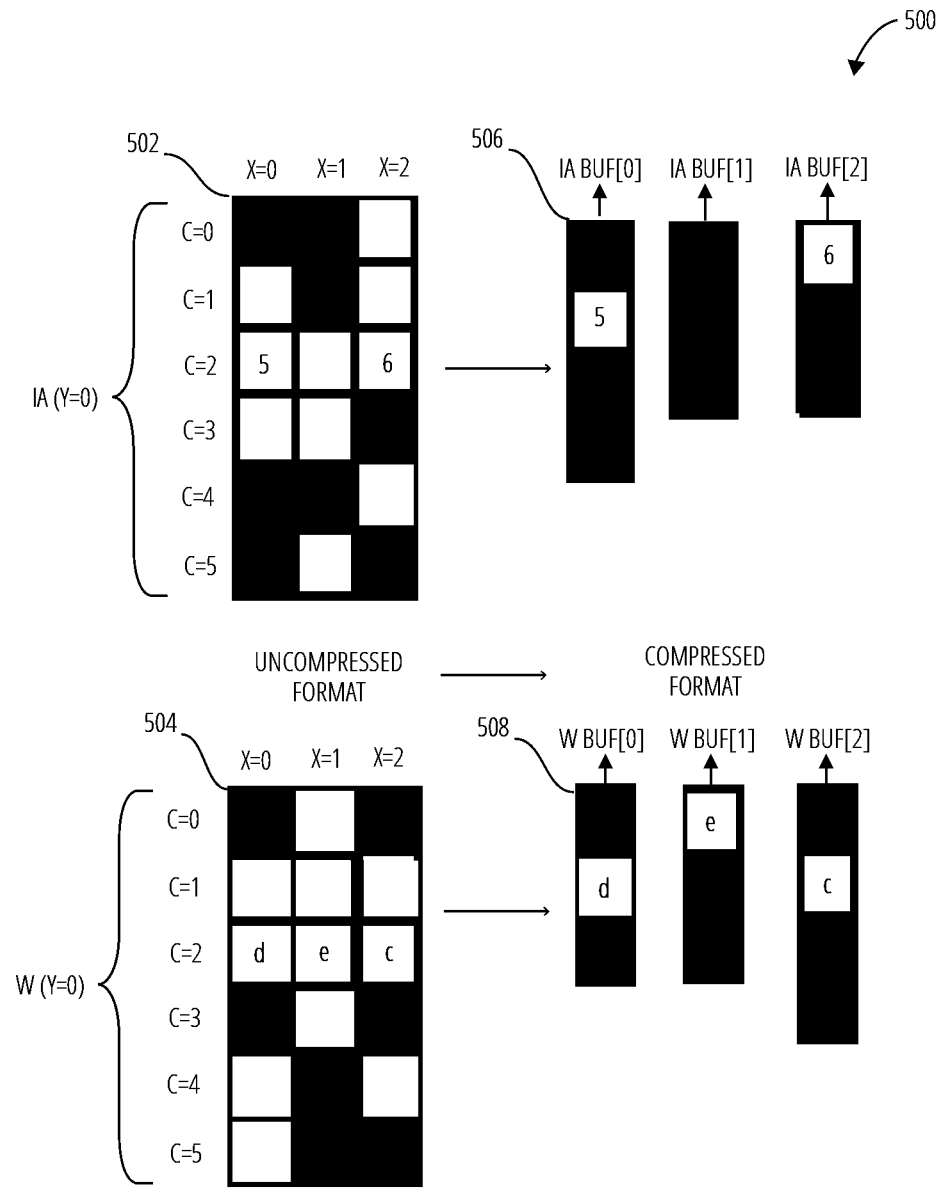
FIG. 5 illustrates an embodiment of a compression process 500.
Figure 6:
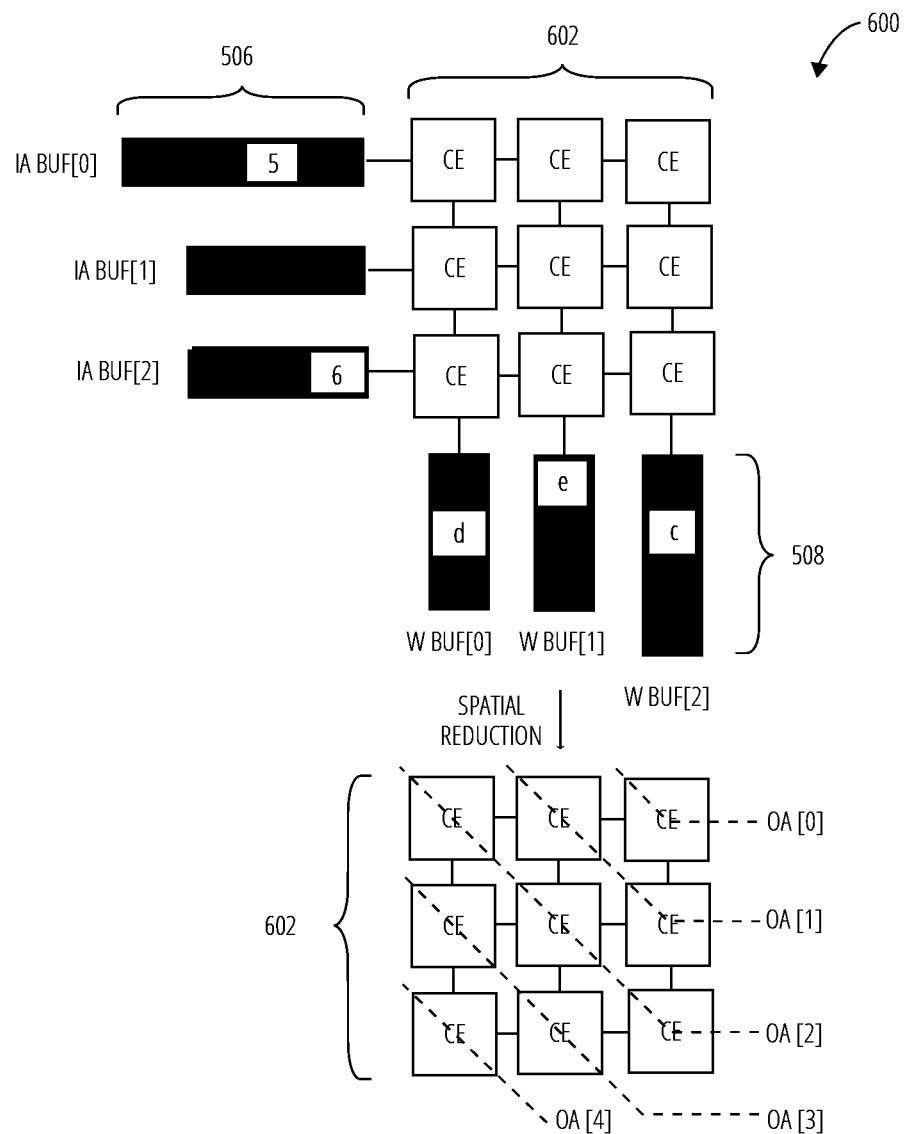
FIG. 6 illustrates an embodiment of a computing element layout 600.

Referring to FIG. 5 and FIG. 6, an embodiment of a compression process 500 for exemplary sparse multidimensional weight and input activation vectors depicts the compression of the uncompressed input activation data vector 502 and the uncompressed weight data vector 504 to the compressed input activation vector 506 and the compressed weight vector 508. Empty entries in the uncompressed input activation data vector 502 and the uncompressed weight data vector 504 indicate that the data is zero, and different shading for the boxes indicates different input channels. The compressed input activation vector 506 and the compressed weight vector 508 illustrate the vectors in compressed form, where some or all zero-valued data is omitted. The compressed input activation vector 506 and the compressed weight vector 508 may be input to the computing element array 602 in channel order.

The computing element layout 600 includes a computing element array 602 to process the compressed input activation vector 506 and the compressed weight vector 508. Each computing element in the computing element array 602 may receive a portion of the compressed input activation vector 506 and compressed weight vector 508 at corresponding x-coordinates. For example, the top-left computing element may receive the portion of the compressed input activation vector 506 corresponding to x=0 and the compressed weight vector 508 corresponding to x=0.

Each computing element receives a column select and a row select from a parallelism discovery unit 300 and the sequence decode unit 400 applies the column select and row select to select matching pairs of input activations and weights from the same input channel (C). As depicted, for the computing element on the top-left corner, the matching pairs are (−1, a) and (5, d). These two pairs are selected by the parallelism discovery unit 300, and the computing element multiplies and accumulates them into a single output accumulation buffer entry. In another example, the computing element on the bottom-right corner operates on (6, c), (8, g), and (13, j), as the channel indices of all three of them are matched. In some embodiment, the computing elements are further spatially reduced (e.g., by a spatial adder tree) to generate output activations. For example, OA[2] may be computed by the top-left computing element, the center computing element, and the bottom-right computing element. The computed output activations are the sent to the output activation local buffer 124.

Figure 7:
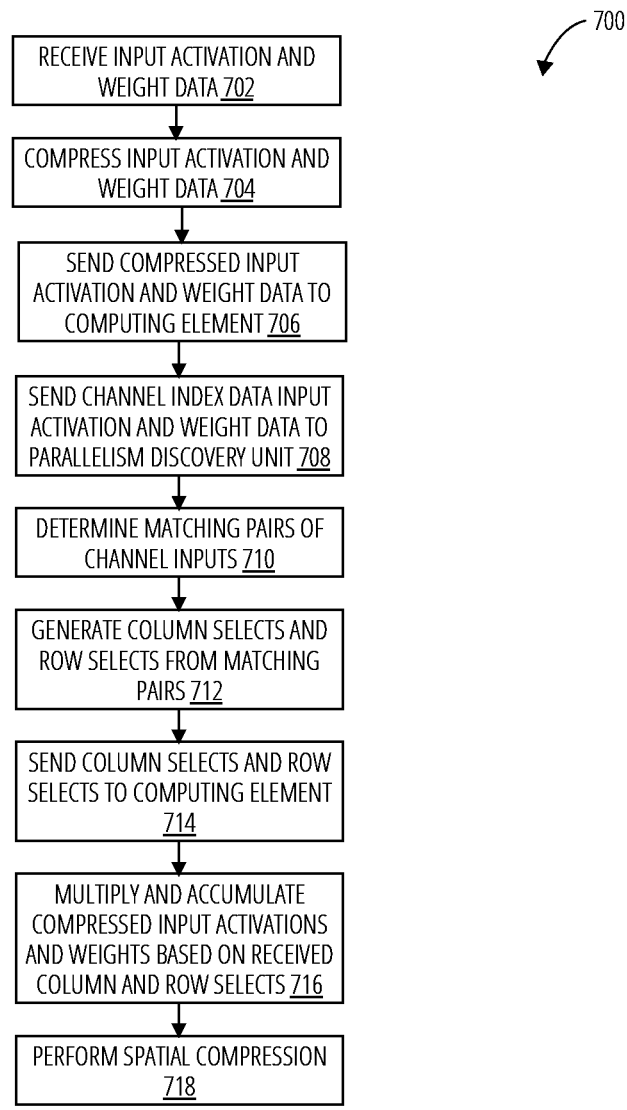
FIG. 7 illustrates an embodiment of a sparse deep learning acceleration method 700.

Referring to FIG. 7, an embodiment of a sparse deep learning acceleration method 700 receives input activations and weights (block 702). These inputs may have an X index, Y index, input channel value (C), and an output channel value (K). The inputs at various coordinates may have zero values. The input activations and the weights are compressed (block 704). The compression may be performed by omitting (e.g., skipping) some or all of the zero-value data. The compressed input activation and weight data are provided to computing elements (block 706). Each computing element may be configured spatially based on the x-coordinate of the input operands. For example, one computing element may process the input activation at x=0 and the weight at x=1 ([0,1]), while another computing element may process the input activation at x=2 and the weight at x=2 ([2,2]). Channel index data for the input activation and the weight operands is provided to a parallelism discovery unit (block 708). The channel input data may be oriented in a tensor along the input channel (C) dimension. The parallelism discovery unit determines matching pairs of channel inputs (block 710). The parallelism discovery unit may utilize an array of comparators to determine the matching pairs. A set of column and row selects are generated from the matching pairs (block 712), which are provided to the computing element (block 714). The compressed (filtered of sparsity) input activations and weights are then multiplied and accumulated in cycles based on the received column and row selections (block 716). Further spatial accumulation may then be performed to generate output activations (block 718).

Figure 8:
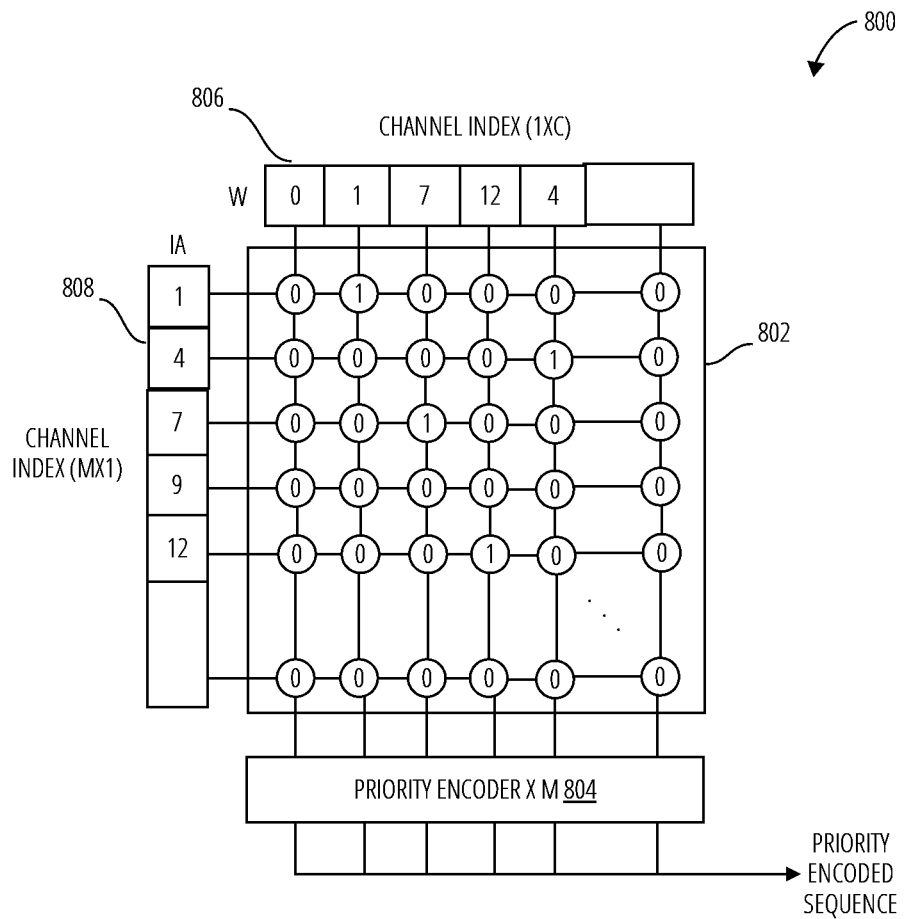
FIG. 8 illustrates an embodiment of a parallelism discovery unit 800.

FIG. 8 illustrates an embodiment of a parallelism discovery unit 800 to generate a priority encoded sequence. The compact input activation and weight vectors are each associated with a corresponding vector that stores the input channel indices of the operands in the arrays. A reducible pair of input activations and weights is a pair with the same input channel index. The parallelism discovery unit 800 determines the reducible input activation and weight pairs by executing a parallel search. The parallelism discovery unit 800 receives the weight channel indices 806 and the input activation channel indices 808. The inputs may be of size M (width and height of the comparator array 802). The parallelism discovery unit 800 thus operates on a block of C operands at the same time. Internally, the parallelism discovery unit 800 utilizes a M×M comparator array 802 to search for matching input activation and weight channel indices in parallel. Each comparator of the comparator array 802 may, in one embodiment, be initialized in an uncompared state (meaning, indeterminate as to whether there is a match or not). The comparator array then produces a binary output at each junction based on the comparison, 1 for a matched state and 0 for an unmatched state, as depicted by example in the comparator array 802.

A priority encoder 804 is connected to each column of the comparator array 802 to determine the row address of the matched pairs. The row of priority encoders produce a vector of M row addresses, and an additional valid bit per address to indicate whether a match was found or not, resulting in a priority encoded sequence of $(\log_2(M)+1)*M$ bits. This sequence is sent to each computing element's sequence decoder to obtain the indices of the matching input activations and weights. The parallelism discovery unit 800 may be operated in accordance with the process depicted in FIG. 9.

Figure 9:
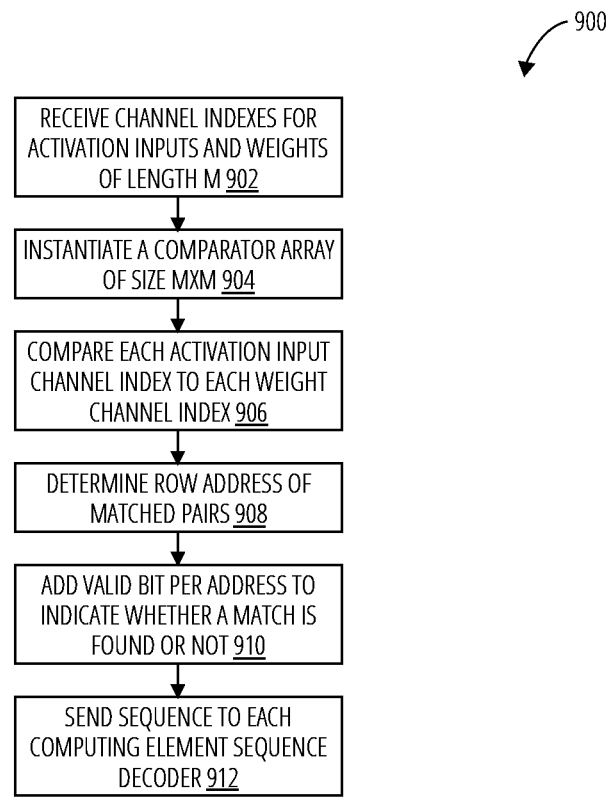
FIG. 9 illustrates an embodiment of an encoding process 900.

Referring to FIG. 9, an embodiment of an encoding process 900 by a parallelism discovery unit receives a vector of channel indices for activation inputs and weights, the vector being of length M (block 902). A comparator array of dimensions M×M is invoked (block 904). Each activation input channel index is compared to each weight channel index (block 906). This process may be completed in parallel for each pair. A match may be represented by a "1" and no match may be represented by a "0". The row address of matched pairs is determined (block 908). The row addresses may be organized into a vector of length M. A valid bit per address is added to indicate whether a match is found or not (block 910). The sequence may be of length, M, and comprise $(\log_2(M)+1)*M$ bits. The sequence is sent to each computing element sequence decoder (block 912).

Figure 10:
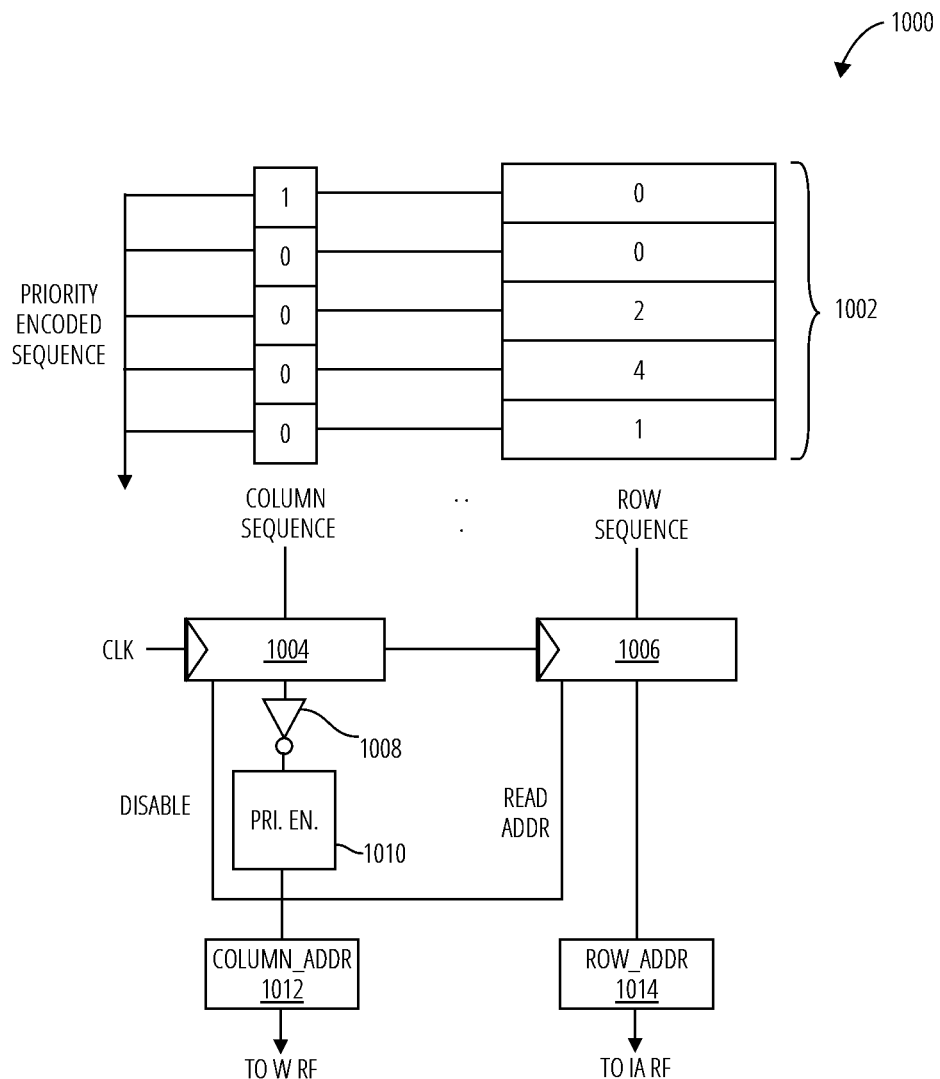
FIG. 10 illustrates an embodiment of a sequence decoder 1000.

Referring to FIG. 10, an embodiment of a sequence decoder 1000 is utilized for each computing element to decode the encoded sequence generated from the parallelism discovery unit to obtain the indices that are used to fetch input activation and weight operands for multiplication.

The priority encoded sequence 1002 is separated into a column sequence (for the W index) and a row sequence (for the IA index) and buffered at the sequence decoder. The column sequence store 1004 stores the 1-bit MSB indicating whether there is any matching input activation found for a weight, while the row sequence store 1006 stores the $\log_2 M$-bit encoded sequence of all the matched weight addresses for each input activation.

The column sequence is first inverted by the inverter 1008. The encoder 1010 is utilized to perform an encoding iteratively on the inverted column sequence. The encoded sequence from the encoder 1010 is utilized as the index to fetch from the weight column sequence, i.e., column_addr. It is also the index to find the corresponding row_addr from the IA's row sequence entry. These outputs are applied to the computing element via the column adder 1012 and row adder 1014 respectively. Exemplary cycles of the sequence decoder 1000 and a computing element are depicted in FIG. 12. The sequence decoder 1000 may be operated in accordance with the process depicted in FIG. 11.

Figure 11:
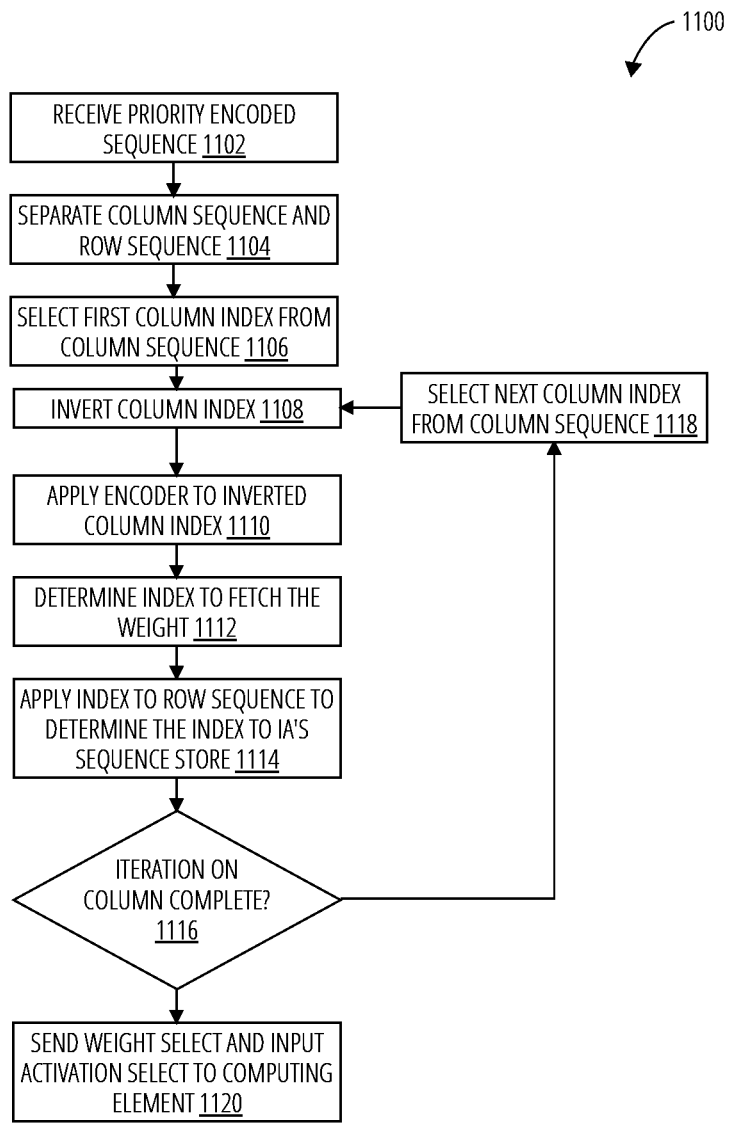
FIG. 11 illustrates an embodiment of a decoding process 1100.
Figure 12:
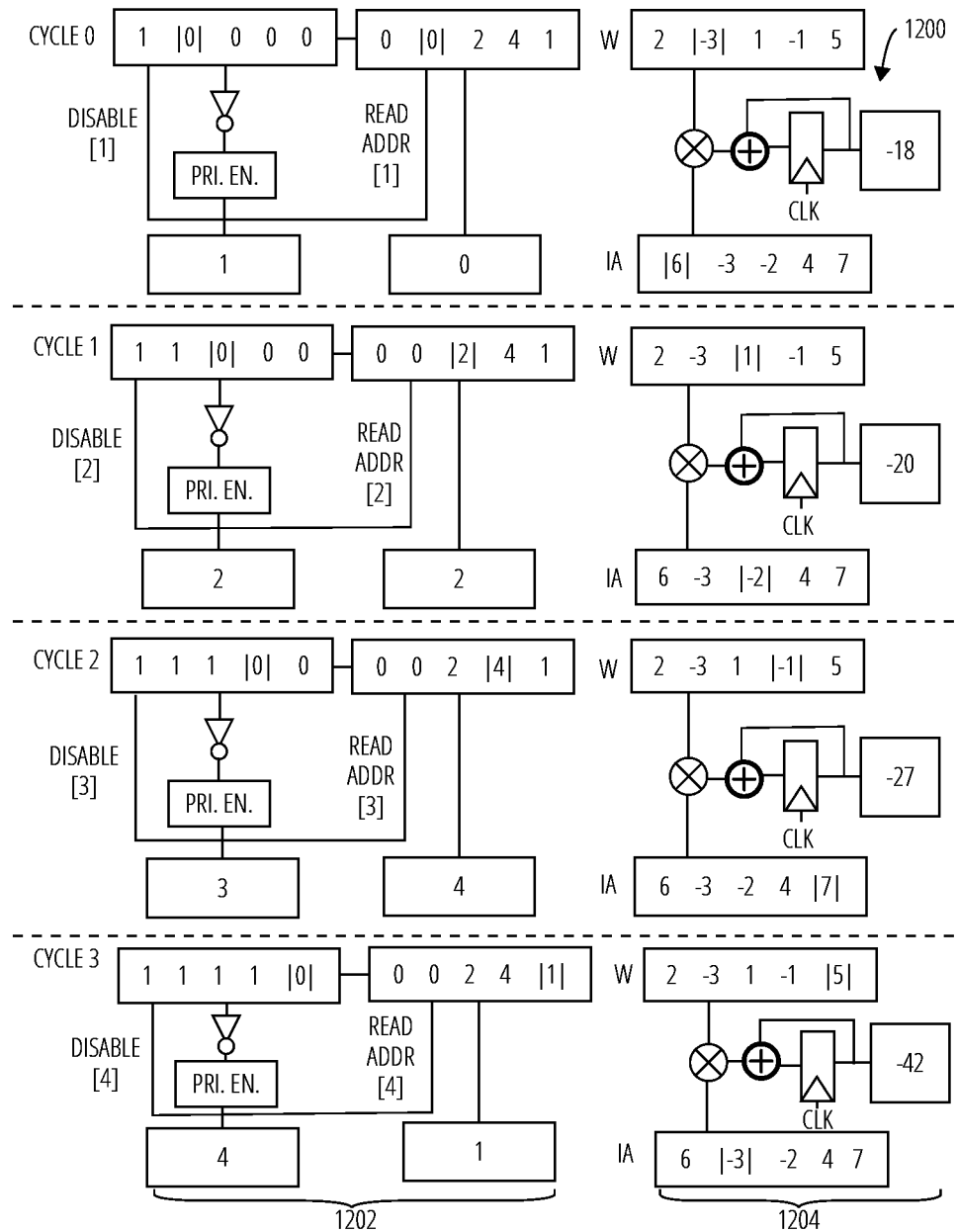
FIG. 12 illustrates an embodiment of a cycling of decoder and computing element 1200.

Referring to FIG. 11, a decoding process 1100 in one embodiment receives a priority encoded sequence (block 1102). The column sequence and row sequence are separate (block 1104). Each may be placed in a respective sequence store. A first column index is selected from the column sequence (block 1106). The column index is inverted by an inverter (block 1108). An encoder is applied to the inverted column index (block 1110). The index to fetch the weight is determined (block 1112). The index from the encoder is also applied to the row sequence to determine the index to IA's sequence store (block 1114). The decoding process 1100 determines if the column iteration is complete (decision block 1116). If not, the next column index is selected from the column sequence (block 1118). The weight select and input activation select is sent to a computing element (block 1120).

Referring to FIG. 12, a cycling of decoder and computing element 1200 is depicted with a decoder 1202 and a computing element 1204. The accessed elements are shown by "| |". In cycle 0, the priority encoding of the decoder 1202 detects column address 1. The decoder 1202 utilizes the column address of 1 to access the row sequence to obtain row address 0. The column sequence receives the column address and sets the location within the array to 1. The computing element 1204 utilizes the effectual pair index (1;0) to read values (−3;6) from the weight and input activation register files, to obtain a partial sum of −18, which is reduced locally to an output activation register file.

In cycle 1, the priority encoding of the decoder 1202 detects column address 2. The decoder 1202 utilizes the column address of 2 to access the row sequence to obtain row address 2. The column sequence receives the column address and sets the location within the array to 1. The computing element 1204 utilizes the effectual pair index (2;2) to read from the weight and input activation RFs, (1;−2), to obtain a partial sum of −2, which is added to the previous partial sum from previous cycles to produce a partial sum of −20. This is reduced locally to an output activation RF.

In cycle 2, the priority encoding of the decoder 1202 detects column address 3. The decoder 1202 utilizes the column address of 3 to access the row sequence to obtain row address 4. The column sequence receives the column address and sets the location within the array to 1. The computing element 1204 utilizes the effectual pair index (3;4) to read from the weight and input activation RFs, (−1;7), to obtain a partial sum of −7, which is added to the previous partial sum from previous cycles to produce a partial sum of −27. This is reduced locally to an output activation RF.

In cycle 3, the priority encoding of the decoder 1202 detects column address 4. The decoder 1202 utilizes the column address of 4 to access the row sequence to obtain row address 1. The column sequence receives the column address and sets the location within the array to 1. The computing element 1204 utilizes the effectual pair index (4;1) is used to read from the weight and input activation RFs, (5;−3), to obtain a partial sum of −15, which is added to the previous partial sum from previous cycles to produce a partial sum of −42. This is reduced locally to an output activation RF.

The cycling of decoder and computing element 1200 continues iteratively, and the partial sum is sequentially accumulated until the entire buffered column sequence is 1, signaling the completion of the processing of a block of input activation and weight array.

Figure 13:
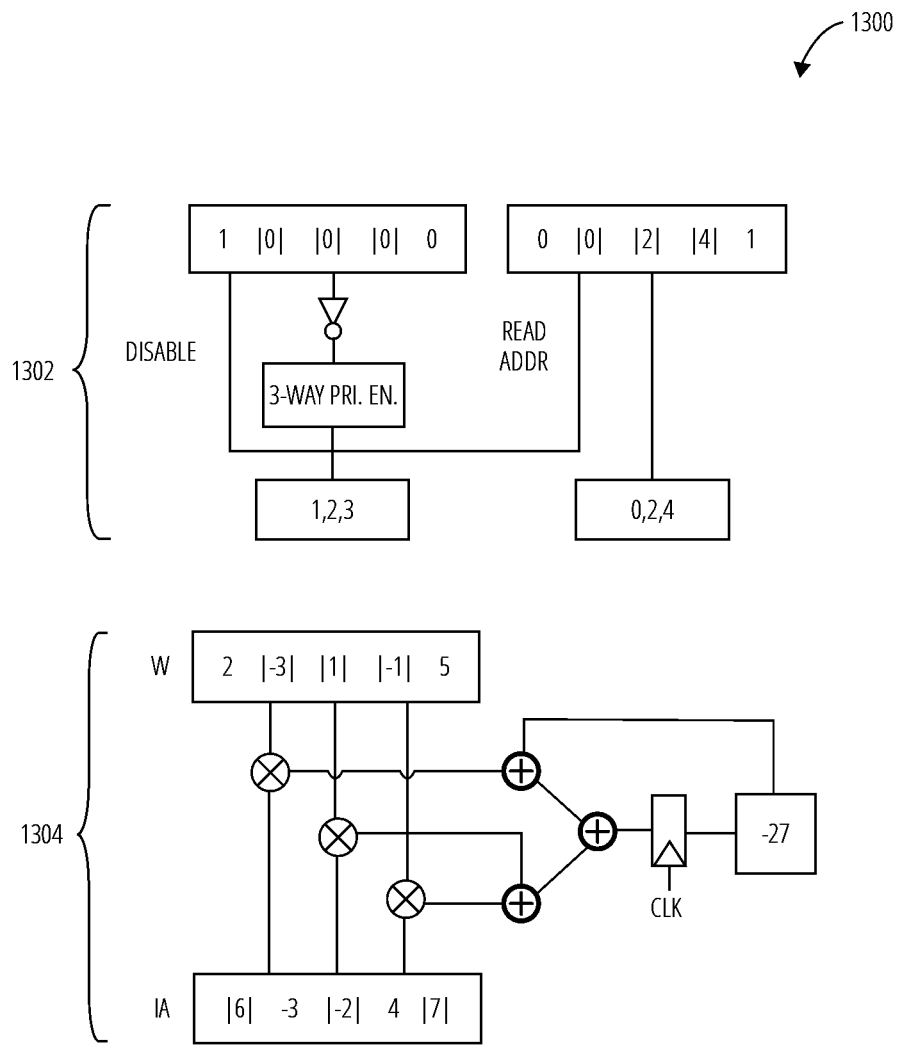
FIG. 13 illustrates an embodiment of a 3-way parallel decoding 1300.

Referring to FIG. 13, a 3-way parallel decoding 1300 embodiment utilizes a 3-way decoder 1302 and a 3-way computing element 1304. A computing element in the accelerator system 100 may utilize a 3:1 spatial reduction block to achieve increased energy efficiency. In this case, the 3-way decoder 1302 produces three pairs of matching input activations and weights per cycle to sustain high multiplier utilization. The 3-way decoder 1302 may detect the first three addresses in the column sequence. Here, the first three addresses are (1,2,3). These are utilized to determine the weights to be multiplied and added by the 3-way computing element 1304. The addresses are also utilized to determine the row addresses, (0,2,4). These are used to determine the input activation to be utilized by the 3-way computing element 1304. The first effectual pair (1;0) is utilized to determine the respective weight and input activation, (−3;6), which is multiplied and added to any partial sum accumulated from a previous cycle. The second and third effectual pairs [(2;2) and (3;4)] are utilized to determine their respective weights and input activations [(1;−2) and (−1;7)]. Those are both multiplied and added together. Then they are added to the sum from the first pair and the accumulation, resulting in a partial sum, −27. The next cycle may determine the next three addresses. In this example, the 3-way decoder 1302 would detect address 4 and no further address as the column array would be complete. The row address would be determined, and the effectual pair sent to the 3-way computing element 1304 for multiplication and addition to the previous partial sum. The encoding and decoding of the parallel parallelism discovery unit are efficiently scalable. That is, given M number of input activations and weights indices, the parallelism discovery unit may produce the matched input activation and weight pairs in one cycle. The exact number of M and decoding parallelism may depend on buffer bandwidth and throughput requirements.

Figure 14:
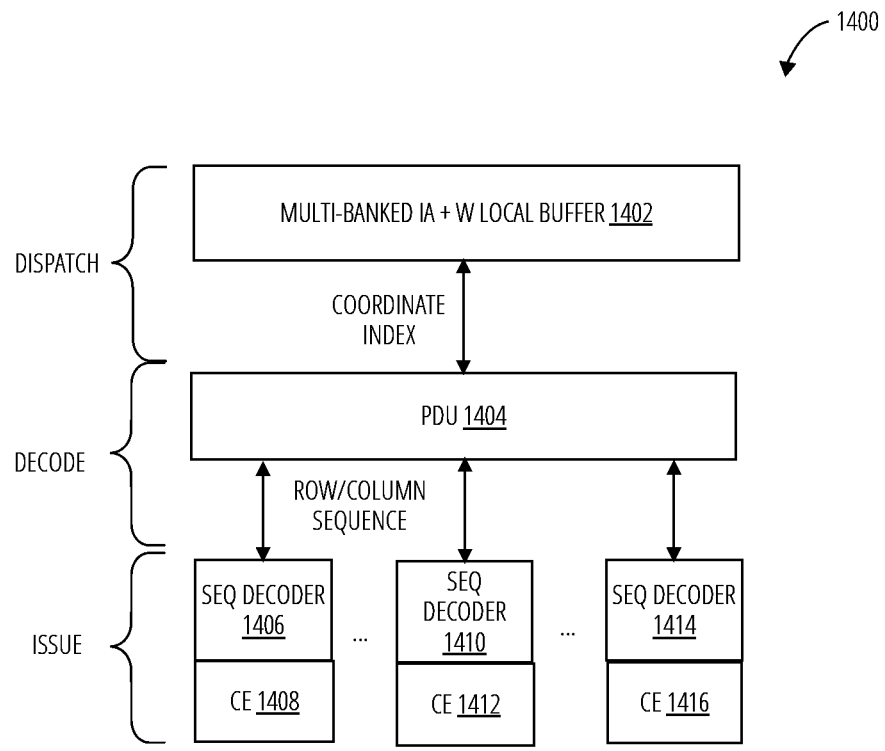
FIG. 14 illustrates an embodiment of an integrated parallelism discovery unit sharing system 1400.

Referring to FIG. 14, an integrated parallelism discovery unit sharing system 1400 in one embodiment comprises a buffer 1402, a parallelism discovery unit 1404, a sequence decoder 1406, a computing element 1408, a sequence decoder 1410, a computing element 1412, a sequence decoder 1414, and a computing element 1416.

Each of the computing element requests a block of coordinates from the multi-banked IA and W local buffer 1402 and forwards them to the parallelism discovery unit 1404 to find matching pairs. The parallelism discovery unit 1404 produces at most M pairs of indices for effectual computation per cycle, where each sequence decodes N elements per cycle for N:1, e.g., 3:1 in FIG. 13, spatial reduction. The accelerator system 100 may implement the parallelism discovery unit 1404 with M=64, despite varying workloads across layers of a pruned deep neural network. In some embodiments, the parallelism discovery unit 1404 may service up to eight computing elements without incurring performance degradation.

Figure 15:
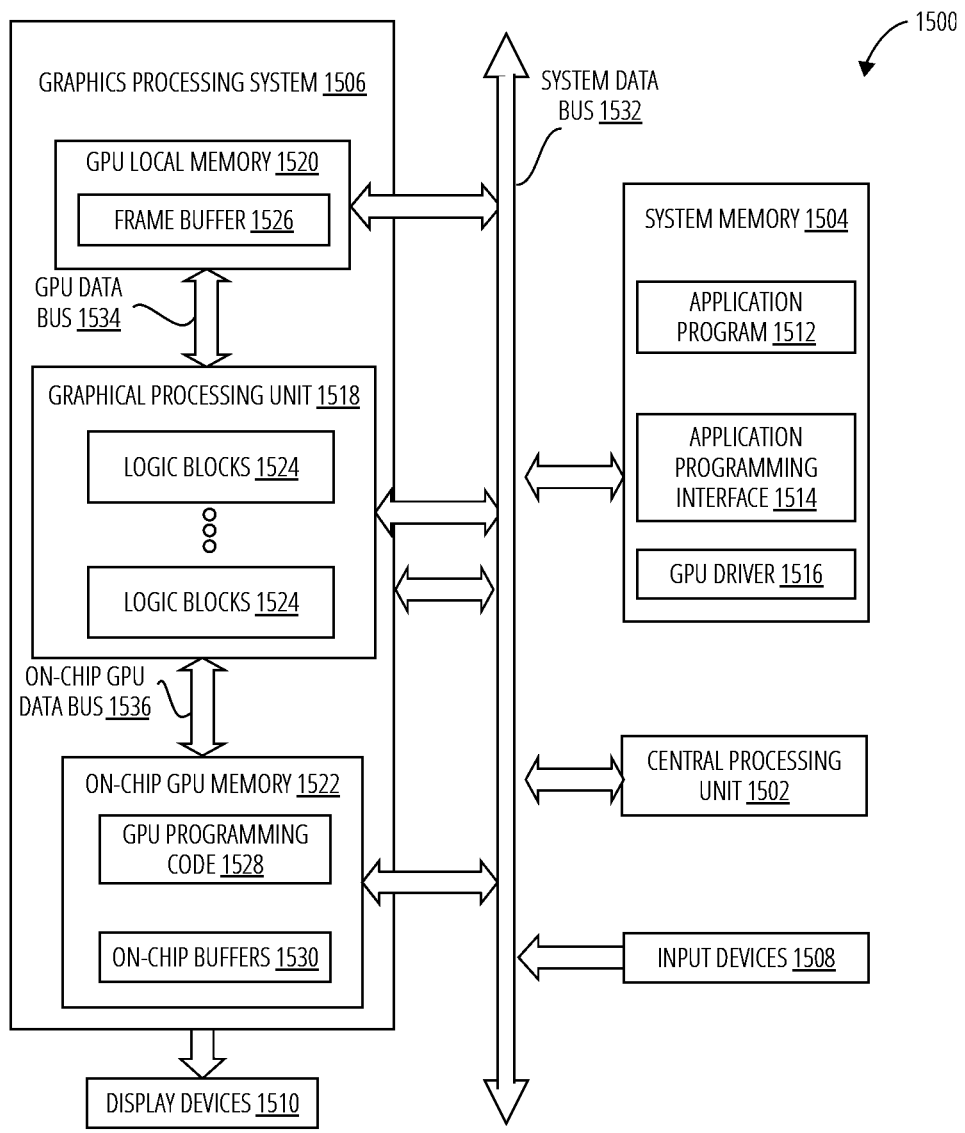
FIG. 15 is a block diagram of a computing system 1500 within which the techniques introduced herein may be embodied or carried out.

FIG. 15 is a block diagram of one embodiment of a computing system 1500 in which one or more aspects of the disclosure may be implemented. The computing system 1500 includes a system data bus 1532, a CPU 1502, input devices 1508, a system memory 1504, a graphics processing system 1506, and display devices 1510. In alternate embodiments, the CPU 1502, portions of the graphics processing system 1506, the system data bus 1532, or any combination thereof, may be integrated into a single processing unit. Further, the functionality of the graphics processing system 1506 may be included in a chipset or in some other type of special purpose processing unit or co-processor.

As shown, the system data bus 1532 connects the CPU 1502, the input devices 1508, the system memory 1504, and the graphics processing system 1506. In alternate embodiments, the system memory 1504 may connect directly to the CPU 1502. The CPU 1502 receives user input from the input devices 1508, executes programming instructions stored in the system memory 1504, operates on data stored in the system memory 1504 to perform computational tasks. The system memory 1504 typically includes dynamic random access memory (DRAM) employed to store programming instructions and data. The graphics processing system 1506 receives instructions transmitted by the CPU 1502 and processes the instructions, for example to implement aspects of a SCNN, and/or to render and display graphics (e.g., images, tiles, video) on the display devices 1510.

As also shown, the system memory 1504 includes an application program 1512, an API 1514 (application programming interface), and a graphics processing unit driver 1516 (GPU driver). The application program 1512 generates calls to the API 1514 to produce a desired set of computational results. For example, the application program 1512 may transmit SCNN programs or functions thereof to the API 1514 for processing within the graphics processing unit driver 1516.

The graphics processing system 1506 includes a GPU 1518 (graphics processing unit), an on-chip GPU memory 1522, an on-chip GPU data bus 1536, a GPU local memory 1520, and a GPU data bus 1534. The GPU 1518 is configured to communicate with the on-chip GPU memory 1522 via the on-chip GPU data bus 1536 and with the GPU local memory 1520 via the GPU data bus 1534. The GPU 1518 may receive instructions transmitted by the CPU 1502, process the instructions, and store results in the GPU local memory 1520. Subsequently, the GPU 1518 may display certain graphics stored in the GPU local memory 1520 on the display devices 1510.

The GPU 1518 includes one or more logic blocks 1524. The logic blocks 1524 may implement embodiments of the systems and techniques disclosed herein for accelerated neural network inference.

The GPU 1518 may be provided with any amount of on-chip GPU memory 1522 and GPU local memory 1520, including none, and may employ on-chip GPU memory 1522, GPU local memory 1520, and system memory 1504 in any combination for memory operations.

The on-chip GPU memory 1522 is configured to include GPU programming 1528 and on-Chip Buffers 1530. The GPU programming 1528 may be transmitted from the graphics processing unit driver 1516 to the on-chip GPU memory 1522 via the system data bus 1532. The GPU programming 1528 may include the logic blocks 1524.

The GPU local memory 1520 typically includes less expensive off-chip dynamic random access memory (DRAM) and is also employed to store data and programming employed by the GPU 1518. As shown, the GPU local memory 1520 includes a frame buffer 1526. The frame buffer 1526 may for example store data for example an image, e.g., a graphics surface, that may be employed to drive the display devices 1510. The frame buffer 1526 may include more than one surface so that the GPU 1518 can render one surface while a second surface is employed to drive the display devices 1510.

The display devices 1510 are one or more output devices capable of emitting a visual image corresponding to an input data signal. For example, a display device may be built using a liquid crystal display, or any other suitable display system. The input data signals to the display devices 1510 are typically generated by scanning out the contents of one or more frames of image data that is stored in the frame buffer 1526.

Embodiments of the systems and techniques disclosed herein may be implemented by logic in one or more aspects.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a crossbar, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). The techniques disclosed herein may be implemented by logic in one or more components or devices.

"Software" refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A deep learning network accelerator comprising:
an encoder to compress an input activation vector and a weight vector to reduce sparsity therein, thereby generating a compressed input activation vector and a compressed weight vector;
a parallelism discovery unit to compare coordinate indexes for the compressed weight vector and for the compressed input activation vector to generate matching pairs of coordinate indexes;
a decoder to generate column selects and row selects from the matching pairs, the column selects and row selects comprising validity markers and addresses for the matching coordinate indexes; and
an array of computing elements to receive the column selects and the row selects from the decoder and to transform the column selects, the row selects, the compressed input activation vector, and the compressed weight vector into output activations of a deep learning network.

2. The deep learning network accelerator of claim 1, wherein the parallelism discovery unit is adapted to:
associate the compressed weight vector and the compressed input activation vector each with a corresponding vector of channel indices; and
execute a parallel search utilizing the corresponding vector of channel indices to determine pairs of reducible input activations and weights.

3. The deep learning network accelerator of claim 2, the parallelism discovery unit comprising an array of comparators to execute the parallel search.

4. The deep learning network accelerator of claim 3, the array of comparators adapted to generate a binary output at each junction indicative of a comparison result.

5. The deep learning network accelerator of claim 3, further comprising:
a plurality of encoders coupled to columns of the array of comparators to determine the row selects of the matching pairs of channel inputs; and
each of the plurality of encoders adapted to generate a valid bit per row select to indicate whether one of the matching pairs of channel inputs was found or not.

6. The deep learning network accelerator of claim 1, further comprising:
operating a sequence decoder for each computing element of the array of computing elements to decode an encoded sequence generated by the parallelism discovery unit to obtain a corresponding vector of channel indices.

7. The deep learning network accelerator of claim 6, further comprising:
the sequence decoder adapted to separate the encoded sequence into a column sequence for the compressed weight vector and a row sequence for the compressed input activation vector and to iteratively encode the column sequence.

8. A deep learning network acceleration method comprising:
receiving an input activation vector and a weight vector;
compressing the input activation vector and the weight vector to omit one or more missing or null values, thus generating a compressed input activation vector and a compressed weight vector;
providing the compressed input activation vector and the compressed weight vector to an array of computing elements configured spatially based on a particular coordinate dimension of the compressed input activation vector and the compressed weight vector;
providing channel indices for the compressed input activation vector and the compressed weight vector to a parallelism discovery unit, the channel indices oriented in an input channel direction;
operating the parallelism discovery unit on the channel indices to determine, via a comparison of the channel indices, matching pairs of channel inputs utilizing an array of comparators, each matching pair comprising a coordinate index for the compressed weight vector and a coordinate index for the compressed input activation vector; and
generating column selects and row selects from the matching pairs of channel inputs and providing the column selects and the row selects and a vector of validity bits along with the compressed input activation vector and the compressed weight vector to the array of computing elements to generate output activations for the deep learning network.

9. The method of claim 8, wherein compressing omits all missing values from the input activation vector and the weight vector.

10. The method of claim 8, further comprising:
the parallelism discovery unit associating the compressed weight vector and the compressed input activation vector each with a corresponding vector of channel indices; and
the parallelism discovery unit executing a parallel search and comparison utilizing the corresponding vector of channel indices to determine pairs of reducible input activations and weights.

11. The method of claim 10, further comprising the parallelism discovery unit operating the array of comparators to execute the parallel search and comparison.

12. The method of claim 11, further comprising:
the array of comparators generating a binary output at each junction indicative of a comparison result.

13. The method of claim 10, further comprising:
a plurality of encoders coupled to columns of the array of comparators to determine the row selects of the matching pairs of channel inputs; and
each of the plurality of encoders generating a valid bit for each of the row selects to indicate whether one of the matching pairs of channel inputs was found or not.

14. The method of claim 8, further comprising:
obtaining a corresponding vector of channel indices by operating a sequence decoder for each computing element of the array of computing elements to decode an encoded sequence generated by the parallelism discovery unit.

15. The method of claim 14, further comprising:
the sequence decoder separating the encoded sequence into a column sequence for the compressed weight vector and a row sequence for the compressed input activation vector; and
the sequence decoder iteratively decoding the column sequence.

16. A system comprising:
an encoder to:
  generate a compressed input activation vector;
  generate a compressed weight vector; and
  apply the compressed input activation vector and the compressed weight vector to a parallelism discovery unit;
a decoder to:
  receive an encoded sequence; and
  decode a column sequence and a row sequence of the encoded sequence into matched pairs of input activations and weights from the compressed input activation vector and the compressed weight vector, and into validity markers indicating which pairs match;
at least one computing element distinct from the parallelism discovery unit and comprising at least one multiply and accumulate unit to generate an output activation for the matched pairs;
the parallelism discovery unit to:
  receive the compressed input activation vector and the compressed weight vector;
  associate the input activations and the weights with channel indices;
  compare and encode the channel indices as the encoded sequence including the column sequence and the row sequence; and
  apply the channel indices to the at least one computing element.

17. The system of claim 16, further comprising two or more computing elements and two or more parallel discovery units, each of the two or more computing elements sending the compressed input activation vector and the compressed weight vector to a corresponding one of the two or more parallel discovery units.

18. The system of claim 16, further comprising two or more computing elements having a spatial layout generating a set of output activations and a spatial compressor to reduce a number of the output activations based on the spatial layout.

19. The system of claim 18, wherein the spatial compressor is a spatial adder tree.

20. The system of claim 16, wherein:
the decoder operates for one or more cycles on the column sequence, each cycle determining a column select from the column sequence and a row select from the row sequence; and
the multiply and accumulate unit operates for the one or more cycles to utilize the column select and the row select to determine one of the matched pairs of the compressed weight vector and the compressed input activation vector to generate a partial sum of a current cycle, the partial sum associated with a final cycle being the output activation.

* * * * *